United States Patent Office 3,142,360
Patented July 28, 1964

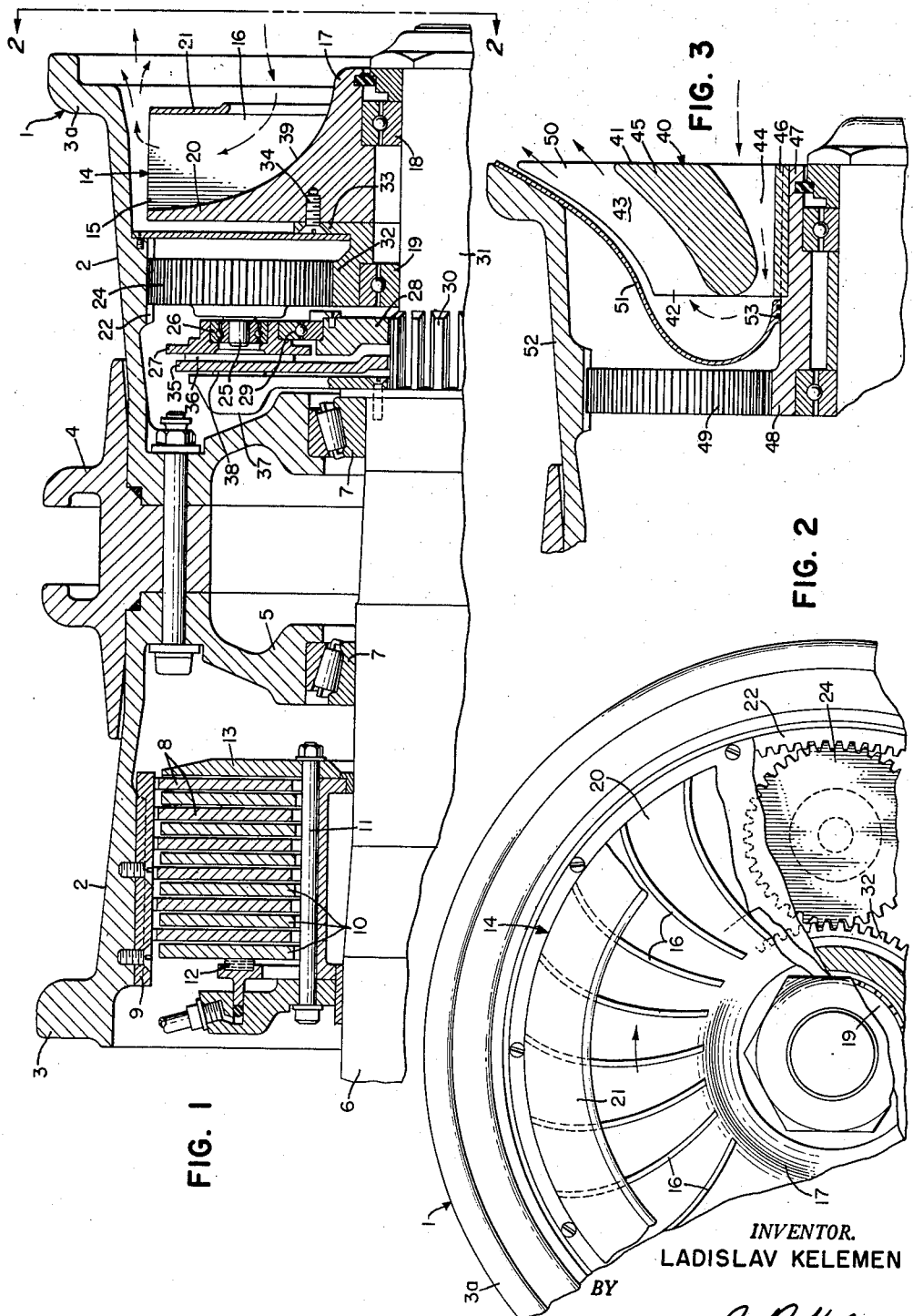

3,142,360
TURBO-BRAKE
Ladislav Kelemen, Akron, Ohio, assignor to The Goodyear Tire & Rubber Company, Akron, Ohio, a corporation of Ohio
Filed Jan. 8, 1962, Ser. No. 164,886
4 Claims. (Cl. 188—90)

The present invention relates to turbo-brakes, and especially to a turbo-brake adapted for use with a vehicle to serve as an auxiliary or supplemental braking means in combination with conventional brake means so that the combination can be used in braking installations where conventional brake means alone may have their capacities exceeded under extreme braking conditions.

It is a well recognized fact that the loads applied to brakes on vehicles today are being continually increased in many instances. Thus either the vehicles themselves are getting larger and heavier, and/or the vehicles, such as airplanes, are landing at higher speeds so that the higher weights and/or speeds of the vehicles necessarily require greater braking forces for satisfactory braking action to be obtained.

Many different types of brake means have been proposed for use heretofore, and one particular type of brakes used widely today on vehicles, such as airplanes, is a friction brake using a plurality of axially aligned, relatively rotatable discs that can have axial compression forces placed thereon to provide the braking action. These brakes heretofore have provided satisfactory braking forces for stopping an aircraft, for example, in a reasonable length run upon landing. However, it naturally is desirable to stop the airplane in shorter lengths, or distances, and it likewise is very desirable to have improved braking actions available for heavier aircraft, or for aircraft landing at higher speeds, or when the aircraft, for example, is making a take-off run and then can't take off and must make a relatively quick stop from its attained speed.

The general object of the present invention is to provide a novel and improved brake means, and particularly to provide a brake characterized by the use of a rotary vane type of an air mover, hereinafter called a turbo-brake, in the braking system in combination with a conventional friction brake means.

Another object of the invention is to provide a turbo-brake connected between a wheel and its axle by a variable speed drive means whereby the turbo-brake can be rotated at a controllable and usually higher speed than that of the wheel so that variable and improved braking action can be provided by rapidly doing work on large masses of air.

A further object of the invention is to provide a high energy absorption, low-heat braking device to supplement a relatively low-energy friction type brake, or similar member whereby improved braking action can be provided under extreme braking conditions, such as upon initial contact of an aircraft with a landing strip.

A further object of the invention is to use the kinetic energy of an airplane, when in motion, to convert it into power for driving a radial flow centrifugal machine, or equivalent turbo-unit, doing work on large masses of air and where large volumes of slightly compressed air are thrown overboard, or discharged at a high velocity from the turbo-unit without any serious heating contact with the airplane wheels.

Another object of the invention is to provide a high energy absorption type of a brake which will absorb large amounts of kinetic energy by means of a high speed, durable impeller having generally radially extending vanes thereon.

Further objects of the invention are to provide an improved brake having increased braking capacity for equal weight braking means made in accordance with prior practice; to permit a reduction in the overall weight of the braking means for a given brake energy output; to reduce the heat generated from braking action under extreme braking conditions; to reduce maintenance and inspection time in brake means on aircraft and to provide an extended service life in brake means with a minimum or no maintenance thereon; to provide a very high reliability in braking designs for high speed aircraft and the like; to have reserve braking power available in braking means for emergency conditions; and to reduce the spin-up loads on aircraft landing gear apparatus and the like.

The foregoing and other objects and advantages of the invention will be made more apparent as the specification proceeds.

For a better understanding of the invention, attention now is particularly directed to the accompanying drawings, where:

FIG. 1 is a vertical section through a wheel having brake means thereon embodying the principles of the invention;

FIG. 2 is a fragmentary end elevation of the wheel and brake means of FIG. 1 with portions broken away for clarity; and FIG. 3 is a fragmentary vertical section, similar to FIG. 1, but of a modified type of turbo-brake of the invention.

When referring to corresponding members shown on the drawings and referred to in the specification, corresponding numerals are used to facilitate comparison therebetween.

Generally speaking, the present invention relates to the combination of an axle, a wheel journalled on the axle, a turbo-brake, or work unit operatively carried by the axle and including a rotatable impeller with generally radially directed vanes thereon, which impeller when rotating discharges air therefrom at a high velocity adjacent the periphery of the wheel, planetary gear means connecting the wheel to the impeller to drive it at a variable and usually greater speed than the rotational speed of the wheel, and clutch means on the axle operatively connected to the planetary gear means to control the action thereof to change the ratio of drive of the air moving impeller in relation to the wheel speed.

Reference now is particularly directed to the details of the structure shown in the accompanying drawings, and a wheel 1 is shown which includes a rim section 2 with a plurality of flanges 3 and 3a provided thereon for engaging a pair of tires to be mounted on the wheel 1. A center rim member 4 is operatively carried by the rim section 2 to aid in positioning a pair of tires in axially spaced relation on the wheel 1. The wheel 1 includes a hub 5 journalled on an axle 6, as by bearing means 7, 7.

Substantially conventional friction type brake means, for example, a plurality of brake discs 8, are operatively and axially movably engaged with the wheel 1 by members, such as a key 9, or the like. Companion brake discs 10 are secured to the axle 6, interleaved between the discs 8, and are adapted for movement axially thereof by slidably engaging a brake torque tube 11, or the like. Hence, when axially directed forces are applied to the axially outermost one of the brake discs 10 by a conventional pressure member 12, the brake discs 8 and 10 are slid axially into frictional braking engagement with each other by being forced against a backing plate 13, secured to the axle 6, as in conventional brakes.

Turbo-Brake

The turbo-brake of the invention primarily comprises a unit for doing work very rapidly on large volumes of air and such unit, for example, is indicated by the numeral 14 and it includes an impeller 15 that has a plurality of generally radially extending vanes 16 formed at equally circumferentially spaced portions thereof. This impeller 15 includes a hub, or hub section 17, carried by the axle 6 and rotatably supported thereon, as by means of bearings 18 and 19 operatively associated therewith.

The impeller 15 includes a frame connected to the hub 17 and having a disc-like section 20 on its axially inner edge that extends out, preferably, to the radially outer edges of the vanes 16 to reenforce and support the vanes. The impeller 15 also preferably has a shroud ring 21 operatively positioned adjacent the axially outer edges of the vanes 16.

As an important feature of the invention, it is very desirable to control and increase the rate of rotation of the impelller 15 in the turbo-brake 14 with relation to the speed of the wheel 1. To this end, the wheel 1 connects to the impeller 15 through planetary gearing means in this instance including a ring gear 22 suitably formed on, or secured to the wheel rim 2. The ring gear 22 operatively engages a plurality of planetary gears 24 having stub shafts 25 journalled in bearings 26. These bearings 26 are secured to a carrier, or positioning ring 27 that is itself rotatably associated with the axle 6, as by being mounted on a disc 28 through an annular bearing 29. The disc 28 engages splines 30 formed on a reduced diameter section 31 of the axle 6 on which the turbo-brake 14 and associated means are positioned.

A substantially conventional sun gear 32, which has an axially and/or radially extending flange 33 formed thereon at one edge thereof, is secured to the impeller 15 by screws 34 to form an integral unit from the impeller 15 and the sun gear 32, which unit is rotatably supported by the bearings 18 and 19. Such sun gear 32 engages the planetary gears 24 whereby, as described hereinafter in more detail, the hub or unit formed with the impeller 15 can be driven at a variable rate of speed with relation to the speed of the wheel 1.

The speed control means provided by the invention include some suitable clutch member that operatively engages the carrier, or positioning ring 27. To this end, a substanially conventional brake mechanism, including a brake disc 35, is carried by the axle 6 to obtain the desired clutch action. Such brake disc 35 has friction means 36 associated with or secured to one face thereof adjacent the positioning ring 27 so that such friction means can be engaged with the positioning ring to stop rotation thereof on the bearing 29. Any conventional brake member, such as a brake support housing 37, is secured to the axle 6 and has an axially movable piston 38 operatively positioned therein for exerting an axially directed force against the brake disc 35. Any suitable control means (not shown) can be provided for actuation and control of this brake piston 38 whereby the carrier, or positioning ring 27 can either be prevented from rotation, or some slippage of such ring with relation to the axle 6 can be permitted for varying the rotational speed of the impeller 15 and the air processing action provided thereby.

The drawings clearly show that the vanes 16 may be slightly curved radially for improved air processing action. The air flow into and through the turbo-brake is facilitated by the shroud ring 21, which is positioned in any suitable manner, as by being secured to the axially outer edges of the vanes 16, and by an axially inwardly radially outwardly extending surface 39 blending the hub 17 into the disc-like section 20.

The sun gear 32 may carry a stop ring or have a stop flange (not shown) at its axially outer end to limit axial movement of the planetary gears 24 and their positioning ring 27.

It should be realized that the size and shape of the impeller vanes 16 provided on the impeller 15 of the turbo-brake, or work unit of the invention may be varied and still obtain effective action. Thus, in FIG. 3 of the drawings, a different type of a rotary vane type of work unit, or turbo-brake, indicated as a whole by the numeral 40, is provided. This turbo-brake, or processing unit 40, includes an impeller 41 which has a plurality of vanes 42 provided thereon and usually formed integrally therewith. In this construction, the vanes 42 have radially outer sections 43 and radially inner sections 44, which sections of the vanes 42 are secured together through an annular body 45 of the impeller 41. The annular body 45 is at the axial outer end of the impeller and forms an air inlet section with the inner vane sections 44 and an air outlet with the outer vane sections 43. Such impeller 41 is secured, as by axial splines 46 and set screw means (not shown) or the like, to a hub 47 that in turn may be formed integrally with or secured to a sun gear 48 driven by a planetary gear 49, or equivalent means, as shown in more detail in the embodiment of the invention shown in FIGS. 1 and 2. The control and drive for the impeller 41 may be the same as in FIGS. 1 and 2.

FIG. 3 shows clearly how the radially inner sections 44 of the impellers provide an inlet or throat of gradually reducing cross section as air is drawn axially inwardly of the impeller 41 and that the radially outer sections 43 of the vanes 42 form a discharge throat 50 in combination with a shroud 51 through which the slightly compressed air is discharged. The shroud 51 is secured to a wheel 52 with which the turbo-brake 40 of the invention is operatively associated and seals the axially inner end thereof. Such shroud 51 may have a radially inner section carrying a plurality of sealing gaskets, or rings 53 that engage the hub 47 for relatively good sealing engagement therewith.

From the foregoing, it will be seen that a novel and improved turbo-brake or air work unit has been provided in association with a wheel and its positioning axle whereby a brake action is obtained by driving the impeller of the air work or mover unit at a relatively high rate of speed in relation to the rotational speed of the wheel with which the turbo-brake is operatively secured. The impeller of the air processing unit is driven, for example, at speeds of from 8 to 20 times the speed of the wheel. The turbo-brakes of the invention are relatively inefficient as air compressors, but are adapted to process extremely large masses of air rapidly to absorb large percentages of the kinetic energy of a large vehicle such as an airplane, under initial landing conditions. Only slight heating and compression of the air are effected in the turbo-brake means. As an important feature of the invention, this turbo-braking action is obtained without any serious increase in the temperature of the wheel on which the turbo-brake is positioned, and there are no parts in the turbo-brake assembly which would wear out or require frequent servicing. Hence, the braking action obtained by the invention is submitted to reduce "turn-around" times for aircraft, as the brakes would not have to be cooled, and no inspection of the brake means would normally have to be made, except after periods of extensive use.

By using the turbo-brake of the invention to absorb large amounts of kinetic energy from the vehicle on which the turbo-brakes are mounted, this greatly saves the frictional brake means provided on the vehicle so that they only need to provide braking forces for the residual kinetic energy of, for example, a plane after it has been slowed down from its initial landing speed. This would greatly improve the effective service life of the conventional friction brakes on the plane even though such conventional brake means are actuated to a greater or less degree for the entire landing run, as their action has been greatly augmented at the high initial landing speed of the aircraft by the turbo-brake means of the invention.

By the use of the clutch means described in association with the turbo-brake unit, it can be disengaged during take-off conditions to eliminate any drag existing in the braking mechanism. Furthermore, the friction brakes provided in the wheel 1 will be effective at slow speeds for the aircraft, at which time the turbo-brake means will be relatively ineffectual. A valve (not shown) may be controlled by the speed of the wheel on the vehicle with which the brake of the invention is associated and be connected in the hydraulic system for the friction brake means and for the control means for the brake (clutch) piston 38, or equivalent, to gradually increase pressure supply to the conventional brake as the wheel speed reduces so that the friction brake will gradually take over all braking action.

The turbo-brake unit of the invention is submitted to have a many-fold extended life in relation to friction brakes or other means having great amounts of wear occurring in portions thereof during the braking action, or in brake means having large amounts of heat generated therein when in use. The turbo-brake of the invention does not add very much weight to the wheel assembly and can provide, under initial landing conditions, increased braking capacity for an equal quantity of weight of a conventional friction type of brake unit which the turbo-brake means would replace. Hence it is believed that the objects of the invention have been achieved.

While two representative embodiments and details of apparatus of the invention have been shown for the purpose of illustrating the invention, it will be apparent to those skilled in this art that various changes and modifications may be made therein without departing from the spirit or scope of the invention.

What I claim is:

1. A turbo-brake for connection between a wheel and an axle on which the wheel is journalled, which turbo-brake comprises
   a rotary-type air mover including an impeller having a hub rotatably carried by said axle,
   a plurality of generally radially extending vanes on said impeller,
   said impeller when rotated drawing air axially inwardly adjacent said axle and forcing air generally radially outwardly adjacent an axial margin of said wheel,
   shroud means secured to said wheel and operatively sealing against said axle, said shroud means being positioned at the axially inner end of said air mover to prevent air flow thereby,
   ring gear means operatively associated with the inner periphery of said wheel,
   planetary gears engaging said ring gear means,
   a disc on which said planetary gears are journalled, said disc being journalled on said axle,
   second gear means operatively carried by said hub and engaging said planetary gears to be driven thereby,
   a brake disc carried by said axle adjacent said disc to retard rotation thereof, and
   brake means operatively positioned on said axle to engage said brake disc and move it into engagement with said first-named disc to retard rotation thereof and control the drive speed of said impeller in relation to the speed of said wheel.

2. In combination with an axle and a wheel journalled on said axle,
   an air mover means operatively carried by said axle and including a rotatable impeller with generally radially directed vanes thereon,
   said impeller being exposed to draw air thereinto and including radially inner and radially outer sections in said vanes and an axially extending annular body extending across said vanes to divide them into said sections to provide radially inner air inlet and radially outer air discharge zones in said impeller, and
   planetary gear means connected said wheel to said impeller to drive it at a greater speed than the speed of said wheel.

3. A turbo-brake for connection between a wheel and an axle on which the wheel is journalled, which turbo-brake comprises
   a rotary type air compressor including an impeller having a hub rotatably carried by said axle,
   a plurality of generally radially extending vanes operatively carried by said impeller,
   said impeller when rotated drawing air axially inwardly adjacent said axle and forcing air generally radially outwardly adjacent an axial margin of said wheel,
   shroud means secured to said wheel and operatively sealing against said axle, said shroud means being positioned axially inwardly of said air compressor to prevent air flow thereby,
   said impeller including an annular body dividing said vanes into radially inner air inlet and radially outer air discharge zones, said shroud means aiding in providing an air flow path for air from said air inlet to said air discharge zones in said impeller,
   planetary gear means operatively carried by and connecting between said wheel and said hub to drive said impeller, and
   brake means on said axle to engage said planetary gear means to regulate rotation thereof and the drive speed of said impeller in relation to the speed of said wheel.

4. A turbo-brake for connection between a wheel and an axle on which the wheel is journalled, which turbo-brake comprises
   a rotary type air compressor including an impeller having a hub rotatably carried by said axle,
   a plurality of generally radially extending vanes on said impeller,
   said impeller when rotated drawing air axially inwardly adjacent said axle and forcing air generally radially outwardly adjacent an axial margin of said wheel,
   endless shroud means operatively connecting and extending between said wheel and said axle, said shroud means being positioned axially inwardly of said air compressor to prevent air flow thereby,
   planetary gear means operatively carried by and connecting between said wheel and the outer periphery of said hub to drive said impeller when said wheel rotates, and
   brake means on said axle to engage said planetary gear means to regulate rotation thereof and the drive speed of said impeller in relation to the speed of said wheel.

References Cited in the file of this patent

UNITED STATES PATENTS

| | | |
|---|---|---|
| 1,903,293 | Isaacson | Apr. 4, 1933 |
| 2,219,215 | Anderson | Oct. 22, 1940 |
| 2,241,189 | Dick | May 6, 1941 |
| 2,415,670 | Black et al. | Feb. 11, 1947 |
| 2,517,531 | Anderson | Aug. 8, 1950 |
| 2,981,380 | Lessly | Apr. 25, 1961 |